March 1, 1960

R. W. LOEFFLER 2,926,545

ADJUSTABLE MOUNTINGS FOR BOAT STEERING MECHANISMS

Filed Aug. 7, 1958

INVENTOR.
Robert W. Loeffler,
BY Morsell & Morsell
ATTORNEYS

March 1, 1960 R. W. LOEFFLER 2,926,545
ADJUSTABLE MOUNTINGS FOR BOAT STEERING MECHANISMS
Filed Aug. 7, 1958 2 Sheets-Sheet 2

INVENTOR.
Robert W. Loeffler,
BY
Morsell & Morsell
ATTORNEYS.

| United States Patent Office | 2,926,545 |
|---|---|
| | Patented Mar. 1, 1960 |

2,926,545

ADJUSTABLE MOUNTINGS FOR BOAT STEERING MECHANISMS

Robert W. Loeffler, Sheboygan, Wis., assignor to The Vollrath Co., Sheboygan, Wis., a corporation of Wisconsin Application August 7, 1958, Serial No. 753,727

3 Claims. (Cl. 74—493)

This invention relates to improvements in adjustable mountings for boat steering mechanisms.

Boat steering mechanisms which will permit efficient and positive rudder control by a remotely mounted steering wheel are in general usage. In such steering mechanisms the steering post, which is usually remote from the motor and rudder and carries the steering wheel or rim, is usually mounted through the dashboard of the boat. In the conventional structures the steering wheel mounting lacks adjustability and, therefore, the steering wheel or rim may not be conveniently or comfortably located with relation to boat operators of various sizes. With the foregoing in mind it is, therefore, a primary object of the present invention to provide a boat steering mechanism which may be adjusted both axially and angularly to vary the proximity of the steering wheel to the body of the boat operator.

A further object of the invention is to provide a dashboard mounted boat steering mechanism wherein the steering post or column is susceptible of up and down angular adjustments within certain limits and wherein the steering post or column may be moved inwardly and outwardly longitudinally relative to the dashboard on which it is mounted.

A further object of the invention is to provide an adjustable mounting for boat steering mechanisms wherein the steering post or column can, through an easy manipulation, be adjusted and retained in a desired position.

A further object of the invention is to provide an adjustable mounting for boat steering mechanisms wherein the internal parts and the mounting bolts are covered and concealed by an attractive, easily removed metallic housing which normally protects the internal mechanism besides keeping it concealed and inaccessible to a tamperer.

A further object of the invention is to provide an adjustable mounting for boat steering mechanisms which is easily applied to the dashboard of a boat, which is neat and attractive in appearance, which permits ready access to the adjusting mechanism when desired, and which is well adapted for the purposes described.

With the above and other objects in view, the invention consists of the improved adjustable mounting for boat steering mechanisms, and its parts and combinations as set forth in the claims, and all equivalents thereof.

In the accompanying drawings in which the same reference characters indicate the same parts in all of the views.

Figure 1:
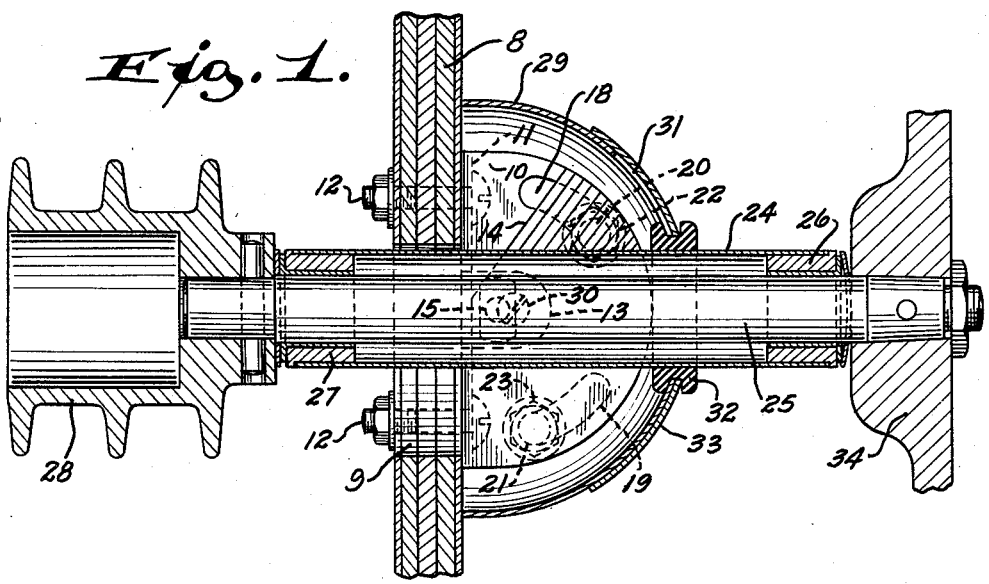
Fig. 1 is a vertical sectional view through the improved adjustable boat steering mechanism and the boat dashboard on which it is mounted, showing the steering column or post in a substantially horizontal position of adjustment and extended outwardly.

Referring now more particularly to the drawings, it will appear that the numeral 8 designates the upright dashboard of a motor boat concerning which the steering rudder (not shown) at the rear of the boat is to be controlled by a forwardly located wheel operated steering mechanism. The latter, according to the present invention, is adjustably mounted on a suitable portion of the dashboard 8 which is provided with a relatively large ovate opening 9 therethrough. On the front surface of the dashboard 8 and adjacent opposite side edges of the opening 9, a pair of complementary flanged brackets 10 are mounted and the same include, besides the forwardly projecting main bracket plates, right angular flanges 11 which extend parallel to the plane of the dashboard and are rigidly secured to the front face thereof by bolts 12. An intermediate portion of the flange 11 of each bracket 10 also carries a forwardly projecting right angularly disposed apertured ear 13.

The numeral 14 indicates a segmental block which is adjustably interposed between the two forwardly projecting main plates of the brackets 10, and the block 14 is pivotally secured thereto by pivot studs 15. The block 14 is formed with a central opening 16 therethrough and below said opening the block is split, as at 17. The forwardly projecting main plates of the mounting brackets 10 are provided with upper and lower arcuate slots 18 and 19, respectively, which arcuately adjustably receive the opposite extremities of transverse bolts 20 and 21. The bolts 20 and 21 are mounted transversely through arcuately spaced portions of the block 14. One set of threaded extremities of the bolts 20 and 21 carry nuts 22 and 23 which may be loosened and tightened for angular adjustments of the block 14 within the brackets 10.

Axially adjustably mounted through the opening 16 in the block 14 is an elongated sleeve 24 which, when the nut 23 on the transverse bolt 21 which extends through the split portion of the block, is loosened, permits axial or longitudinal fore and aft projection of the sleeve 24, relative to the block 14.

Extending axially through the sleeve 14 and turnable therein, is an elongated steering post 25 which projects beyond both ends of the sleeve 24 and is engaged by bushings 26 and 27 at each end of the sleeve. The projecting end of the steering post 25 beyond the inner face of the dashboard 8 has secured thereto a sheave 28 on which a cable (not shown), extended to the boat rudder, is adapted to be wound.

Figure 2:
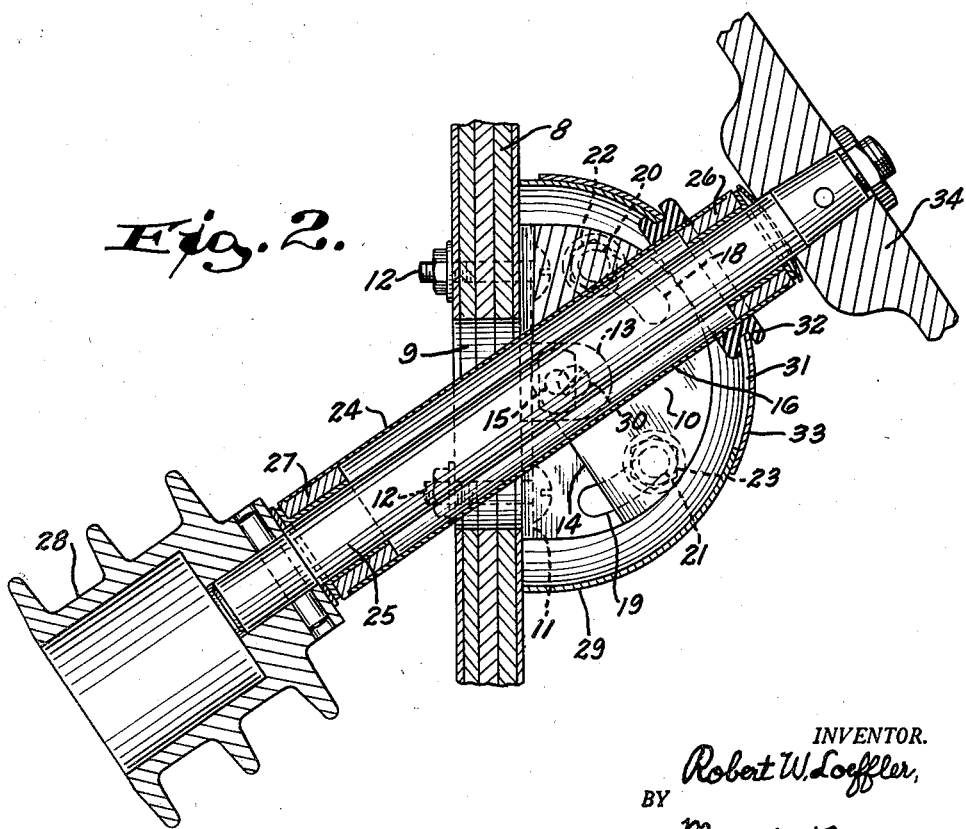
Fig. 2 is a similar vertical sectional view only showing the steering post or column tilted at a substantial angle from horizontal and retracted.
Figure 3:
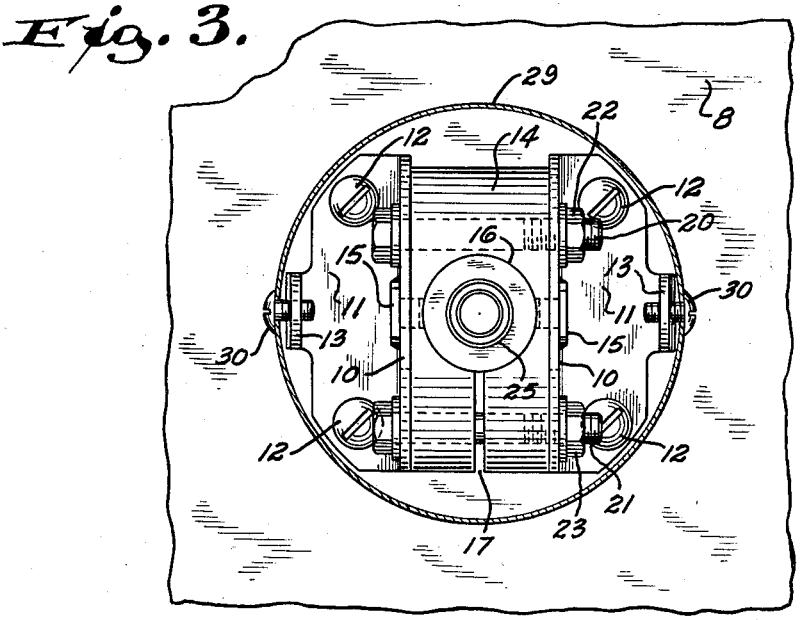
Fig. 3 is a front view of the steering mechanism assemblage with the housing shown in section and the steering wheel removed.
Figure 4:
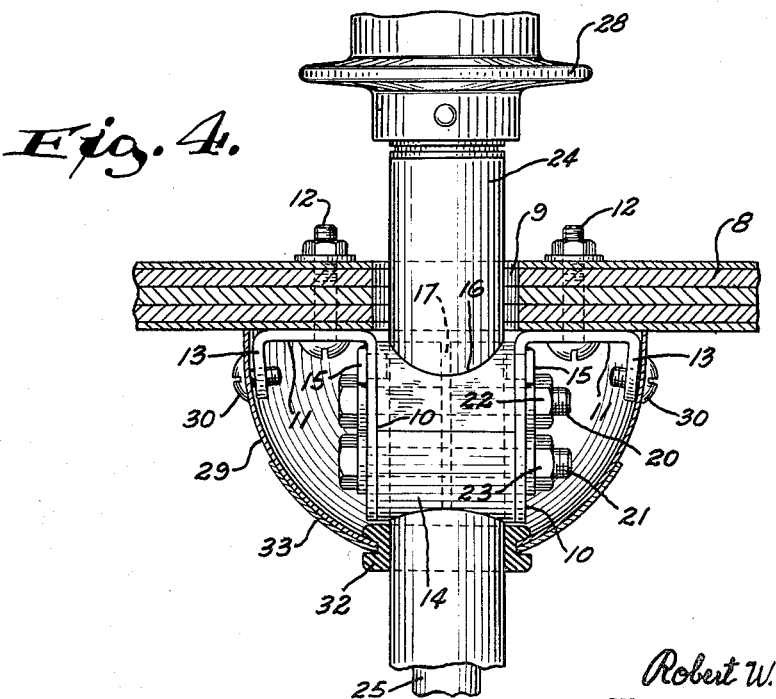
Fig. 4 is a horizontal sectional view through the adjustable steering mechanism and the boat dashboard on which it is mounted.

Normally the flanged mounting brackets 10 and the segmental block 14 adjustably carried thereby are covered by a substantially semi-spherical metallic housing 29. The open side of the housing abuts against the front face of the dashboard 8 and the housing is removably held to the ears 13 on the bracket flanges 11 by means of screws 30. The front of the semi-spherical housing 29 has therein an elongated opening 31 to accommodate the outwardly projecting sleeve 24 when the same is angularly adjusted in a vertical plane. The housing opening 31 extends substantially above the horizontal center line of the assemblage so that the sleeve-enclosed steering post 25 may be adjusted through an angle of about 35° upwardly from horizontal. The two extreme positions of adjustment are shown in Figs. 1 and 2.

Secured to a portion of the sleeve 24 inwardly from its outer end by means of a resilient grommet 32, is a saucer-shaped cap 33 which conforms to the curvature of the housing 29 and covers the elongated opening 31 therein. When the steering post-carrying sleeve 16 is angularly adjusted upwardly or downwardly between the extreme positions shown in Figs. 1 and 2, which adjustments can be accomplished when the nuts 22 are loosened, the metal cap 33 will slide on the spherical surface of the metal housing 29.

The outer end portion of the steering post has secured thereto the hub portion 34 of a steering wheel or rim. It is obvious that in the operation of the improved steering mechanism the boat operator will turn the steering wheel 34 and this will in turn impart turning movement to the steering post 25 which carries the sheave 28. The latter is adapted to wind or unwind the cables which extends rearwardly in the boat to the rudder and thus the rudder is accurately remotely controlled from a convenient operator's position in the bow of the boat.

Due to differences in the size of boat operators, it is advantageous that the position of the steering wheel 34 relative to the operator be susceptible of adjustment and this is accomplished by the mechanism of the present invention. By the removal of the housing securing screws 30, the housing may be separated from the dashboard so as to give access to the series of nuts 22 and 23 which extend through the brackets 10 and segmental adjusting block 14. When the lowermost nuts 23 are released, the lower split portion of the segmental block 14 may spread somewhat to ease the clamping effect between the block opening 16 and the sleeve 24. Thereupon the sleeve may be adjusted axially relative to the block 14 to position the steering wheel 34 further away from the body of the boat operator, or closer to the body of the operator. By loosening the upper nuts 22 as well as the lower nuts 23, limited up and down pivotal movement of the block 14 in a vertical plane may be accomplished. As the block carries the sleeve 24 and the steering post 25, an angular adjustment of the steering post to suit the convenience of the operator may be accomplished. In making such angular adjustment the end portions of the bolts 22 and 21 ride in the arcuate slots 18 and 19 in the bracket plates 10. When proper adjustments, to suit the convenience of the operator, are accomplished, the bolt-carried nuts 22 and 23 are tightened which will serve to secure the assemblage in the desired position of adjustment. Then, the housing 29 may be reassembled relative to the brackets 10 by threading the screws 30 through openings therefor in the housing and in the ears 13 of the brackets. With the housing 23 in place and with the cap 33 applied, the internal adjustable elements of the steering mechanism assemblage are covered, concealed and protected, as are the bolts by which the brackets are attached to the dashboard.

The boat steering mechanism assemblage is easily installed on the dashboard of a motor boat and is attractive in appearance. The housing 29 may be easily displaced to permit access to the adjustable elements and the entire assemblage is susceptible of easy assembly and disassembly for parts replacements if necessary. By means of the axial or in and out adjustment of the steering post-carrying sleeve and the angular adjustment of the sleeve relative to the dashboard mounted brackets, the position of the steering post and the rim may be adapted to meet the particular requirements of the boat operator for the utmost in comfort and convenience. The improved adjustable mounting for boat steering mechanisms is relatively inexpensive, is easy to adjust and manipulate, and is well adapted for the purposes described,

What is claimed as the invention is:

1. A control mechanism mounting, comprising a support having an opening therein, a bracket fixed to said support adjacent the opening, a block angularly adjustably mounted on said bracket and having an opening therein registering with said support opening, an independent sleeve axially adjustably extended through the block and support openings, an independent post movably mounted within said sleeve, means adjustably engaging the block to hold the sleeve in axially adjusted relation thereto and to hold the block in a desired position of angular adjustment relative to the bracket, a housing mounted on the sleeve in normal enclosing relation to the support opening, the bracket and the block, and means for releasably anchoring the housing to the bracket in the last-mentioned position.

2. An adjustable steering mechanism mounting for boats, comprising a generally upright support having an opening therein, a pair of brackets fixed to said support on opposite sides of the opening, a segmental block vertically angularly adjustably mounted between said brackets, means for releasably securing the block to the brackets in a selected position of adjustment, said block having an opening therein registering with said support opening, the stock of the block adjacent its opening being split and provided with clamping means, an independent sleeve axially adjustably extended through the block and support openings, an independent post turnably mounted within said sleeve and projecting beyond both ends thereof, a steering wheel fixed to one end portion of the post, and a rudder control element fixed to the other end portion of the post.

3. A boat steering mechanism mounting, comprising a dashboard having an upwardly directed elongated opening therein, a bracket fixed to said dashboard adjacent the opening, a block vertically angularly ajustably mounted on said bracket and having an opening therein registering with said dashboard opening, an independent sleeve axially adjustably extended through the block and dashboard openings, an independent post turnably mounted within said sleeve, means adjustably engaging the block to hold the sleeve in axially adjusted relation thereto and to hold the block in a desired position of angular adjustment relative to the bracket, a housing shiftably mounted on the sleeve in normal enclosing relation to the dashboard opening, the bracket and the block, and a steering wheel carried by an end portion of the post.

References Cited in the file of this patent

UNITED STATES PATENTS

| | | |
|---|---|---|
| 911,069 | Perkins | Feb. 2, 1909 |
| 1,368,959 | Moller | Feb. 15, 1921 |
| 1,784,230 | Freeman | Dec. 9, 1930 |
| 1,891,208 | Schuetz | Dec. 13, 1932 |
| 2,396,309 | Wodal | Mar. 12, 1946 |
| 2,555,811 | Peterson | June 5, 1951 |
| 2,826,090 | Grinnell et al. | Mar. 11, 1958 |
| 2,830,464 | Winterbauer | Apr. 15, 1958 |

FOREIGN PATENTS

| | | |
|---|---|---|
| 434,896 | Great Britain | Sept. 11, 1935 |